May 18, 1926.
F. E. BEST
GEAR SHIFTING DEVICE
Filed June 21, 1924
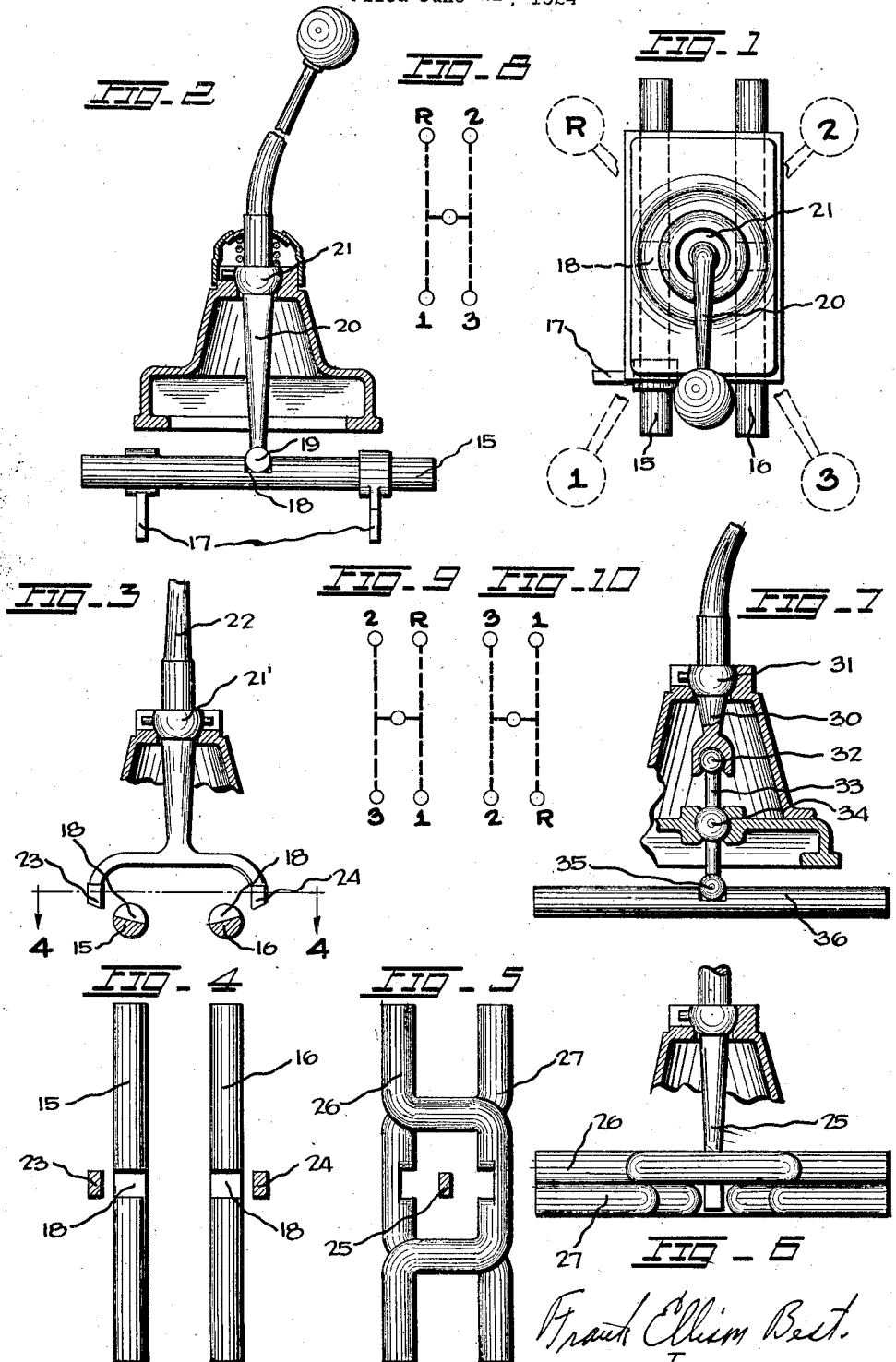

Patented May 18, 1926.

1,585,364

UNITED STATES PATENT OFFICE.

FRANK ELLISON BEST, OF SEATTLE, WASHINGTON.

GEAR-SHIFTING DEVICE.

Application filed June 21, 1924. Serial No. 721,479.

My invention relates to improvements in gear shift means for use in connection with variable speed motor vehicle power transmissions of the selective sliding gear type and the object of my invention is to provide simple and efficient gear shift means that may be be used to replace corresponding parts on an existing transmission to change or reverse the direction of movement of a gear shift lever relative to the direction of movement of certain parts by which the gears are shifted thereby making it possible to change the direction of movement of a gear shift lever to suit the user and yet retain the proper movements of the gear shifting means.

The usual motor vehicle power transmission of the selective sliding gear type is operated by a hand lever having a neutral or inoperative position and four different operative positions, namely, low speed, second or intermediate speed, high speed and reverse. The positions into which the gear shift lever must be moved to secure the various forward drives, and the reverse drive are different on different types of vehicles thus making it inconvenient, awkward and dangerous for a person who is used to one type of gear shift to use another, or for a person who drives several vehicles to have to move the gearshift lever into certain positions to secure desired driving relations on one vehicle and into different positions to secure the same driving relation on other vehicles. The danger and inconvenience arising from this condition are due to the fact that after a person becomes used to a gear shift, the movements required for securing the several driving relations become habitual and are performed without any conscious thought so that such a person in using a different gear shift will unconsciously shift his gears into the wrong driving relation as, for instance he may set gears in reverse when he intended to move forwardly.

My invention overcomes this difficulty by making it possible for a person to change the gear shift means so that the movements required for shifting the gears to the various positions will be the movements to which he has become accustomed.

Further and more specific objects will be apparent from the following description taken in connection with the accompanying drawings.

In the drawings, Figure 1 is a somewhat diagrammatic plan view of gear shift means of well known standard type of construction, showing, by full lines, the gear shift lever in a neutral position and, by dotted lines, the four operative positions into which said gearshift lever may be moved.

Fig. 2 is a somewhat diagrammatic view in side elevation of the same.

Fig. 3 is a detached view partly in elevation and partly in cross section of gearshift reversal means constructed in accordance with my invention.

Fig. 4 is a view partly in plan and partly in section of the same substantially on broken line 4—4 of Fig. 3.

Fig. 5 is a fragmentary plan view illustrating a modified form of reversal gear shift means for accomplishing the same purpose as the means shown in Figs. 3 and 4.

Fig. 6 is a fragmentary view in side elevation of the devices shown in Fig. 5.

Fig. 7 is a fragmentary view partly in section and partly in side elevation of another form of gear shift reversal device that functions in a different manner from the devices shown in Figs. 3 to 6 inclusive.

Figs. 8, 9 and 10 are diagrams illustrating the positions of the gear shift lever for various driving conditions in three different types of transmission now in common use.

Like reference numerals designate like parts throughout the several views.

In Figs. 1 and 2 I have illustrated parts of the usual standard gear shift for selective sliding gear transmissions embodying two shifter rods, 15 and 16 reciprocable longitudinally and having shifter forks 17 arranged to engage with and shift gears of well known form, not shown.

The shifter rods 15 and 16 are provided with means, as notches 18, in which the lower end 19 of a gear shift lever 20 may engage for shifting said rods. The gearshift lever 20 is pivoted for universal movement by ball and socket fulcrum means 21 so that said lever may first be removed sidewise from a neutral position to engage the lower end of the same in one of the notches 17 and may then be moved forwardly or rearwardly to shift certain gears.

In the gear shift known as the standard type of gear shift, Figs. 1, 2 and 8 the gears are shifted into low speed forward driving relation by movement of gear shift lever 20 to the left and rear from the neutral position to position marked "1"; are shifted into second or intermediate forward driving relation by movement to the right and forward from the neutral position to position marked "2"; are shifted into high speed forward driving relation by movement to the right and rearward from the neutral position to position marked "3" and are shifted into reverse by movement to the left and forward from the neutral position.

In another much used type of gear shift the arrangement of the shifting lever and shifter rods 15 and 16 is the same and the movements from neutral to the various driving positions are as follows: see Fig. 9, to right and rear for first or low; to left and forward for second or intermediate; to left and rear for third or high and to right and forward for reverse.

To change either one of these gear shifts so that the movement of the shifting lever to secure the various driving relations will be exactly the same as in the other gear shift I provide, Figs. 3 and 4, a gear shift lever 22, fulcrumed at 21′ for universal movement and having a forked lower end affording two shifter rod engaging members 23 and 24 positioned on the outside of the shifter rods 15 and 16 respectively when in neutral, instead of between said shifter rods as is the lower end 19 of lever 20 so that movement of lever 21 to either side will engage the lower end of said lever with the shifter rod 15 or 16 opposite to that which would be engaged by lever 20 if moved to the same side, the relative directions of sidewise movement of levers 20 and 21 to engage the same shifter rod being reversed but the forward and rearward movement of said levers to any required position after the desired shifter rod is engaged being the same.

In Figs. 5 and 6 I have shown another arrangement by which movement of a shifter lever 25 to either side may effect engagement of the bottom end of said shifter lever with the opposite shifter bar than would the standard arrangement shown in Figs. 1 and 2, said arrangement consisting in the provision of shifter bars 26 and 27 that are bent crank shaped between their two ends and are crossed so that movement of the bottom end of lever arm 25 toward one side causes it to engage with the shifter bar on the opposite side.

In Fig. 7 I have shown a double lever arrangement by which the movements of the part that actuates the shifter rods are completely reversed relative to the corresponding movements of the standard type of gear shift.

This device embodies a gear shift lever 30 fulcrumed at 31 and having a universal, or ball and socket connection 32 with a shorter lever 33 that is fulcrumed for universal movement as at 34 and has a bottom end 35 arranged to engage with two shifter rods 36 that are identical with shifter rods 15 and 16. If this device is applied to a well known type of transmission in which the normal shifting movements of the gear shift lever, as shown by the diagram in Fig. 10, are exactly opposite to the usual standard movements shown in Fig. 8 then all movements will be exactly reversed and this gear shift will operate in the same manner as the standard type. Conversely, if the mechanism shown in Fig. 7 is applied to a standard type of gearshift then the movements required for shifting will be changed to correspond to Fig. 10.

The above described mechanism makes it easy for a person that is accustomed to a standard type of gear shift to quickly and easily change either the form shown in Fig. 9 or Fig. 10 to conform to standard shifting lever movements and further enables a person who is accustomed to either the form shown in Fig. 9 or 10 to change a standard type of gear shift to conform to the desired movements in accordance with either Fig. 9 or 10.

The foregoing description and accompanying drawings clearly disclose a preferred embodiment of my invention, but, it will be understood that this disclosure is merely illustrative and that such changes may be resorted to as are within the scope and spirit of the following claims:

I claim:

1. The combination with a motor vehicle power transmission having two longitudinally movable shifter rods, of a pivotally mounted lever movable sidewise for selectively engaging said shifter rods the bottom end of said lever being arranged to engage with the rod at the side toward which said lever is moved.

2. The combination with a motor vehicle power transmission having two longitudinally movable spaced apart shifter rods, of a lever pivoted for universal movements on a pivot disposed in a vertical plane that passes between said rods and means on the bottom end of said lever arranged to engage the right hand shifter rod when the top end of said lever is moved to the right and the left hand shifter rod when the top end of said lever is moved to the left.

3. A motor vehicle gear shift lever having a forked bottom end the respective members of which are arranged to be positioned on the outer sides of the usual gear shift rods.

4. In the usual motor vehicle power transmission, means for reversing the direction of movement of the gear shift lever required for engaging the same with the usual longitudinally movable shifter rod embodying a gearshift lever having a forked bottom end.

5. The combination with a motor vehicle power transmission having two longitudinally movable shifter rods disposed side by side, of a pivoted gear shift lever having a forked lower end, one part of which is disposed on the outside of each of said shifter rods and arranged to engage with the adjacent shifter rod when the top end of said lever is moved to one side.

FRANK ELLISON BEST.